United States Patent [19]

Sacchetti et al.

[11] Patent Number: 5,578,541
[45] Date of Patent: Nov. 26, 1996

[54] COMPONENTS AND CATALYSTS FOR THE POLYMERIZATION OF OLEFINS

[75] Inventors: Mario Sacchetti; Illaro Cuffiani, both of Ferrara; Gianni Pennini, Porotto, all of Italy

[73] Assignee: Montell Technology Company bv, Netherlands

[21] Appl. No.: 10,750

[22] Filed: Jan. 29, 1993

[30] Foreign Application Priority Data

Jan. 31, 1992 [IT] Italy ................... MI92A0195

[51] Int. Cl.⁶ .................................. B01J 31/00
[52] U.S. Cl. ................ 502/126; 502/9; 502/111; 502/119; 502/125; 502/127; 502/134
[58] Field of Search ................ 502/9, 134, 126, 502/127, 125, 111, 119

[56] References Cited

U.S. PATENT DOCUMENTS

| | | |
|---|---|---|
| 3,953,414 | 4/1976 | Galli et al. . |
| 4,298,718 | 11/1981 | Mayr et al. . |
| 4,399,054 | 8/1983 | Ferraris et al. . |
| 4,495,338 | 1/1985 | Mayr et al. . |
| 4,710,482 | 12/1987 | Job ........................................ 502/127 |
| 4,727,051 | 2/1988 | Breen et al. ............................ 502/126 |
| 4,904,628 | 2/1990 | Albizzati et al. ...................... 502/126 |
| 5,141,910 | 8/1992 | Job ........................................ 502/127 |
| 5,204,303 | 4/1993 | Korvenoja et al. .................... 502/127 |
| 5,221,651 | 6/1993 | Sacchetti et al. ...................... 502/127 |
| 5,229,342 | 7/1993 | Job ........................................ 502/127 |

FOREIGN PATENT DOCUMENTS

| | | |
|---|---|---|
| 0097131A1 | 12/1983 | European Pat. Off. . |
| 0119963A1 | 9/1984 | European Pat. Off. . |
| 0281524A2 | 9/1988 | European Pat. Off. . |
| 0065700B1 | 3/1989 | European Pat. Off. . |
| 0358264A2 | 3/1990 | European Pat. Off. . |
| 0243327B1 | 6/1990 | European Pat. Off. . |
| 0395083A2 | 10/1990 | European Pat. Off. . |

*Primary Examiner*—Anthony McFarlane
*Assistant Examiner*—E. D. Irzinski
*Attorney, Agent, or Firm*—Bryan Cave LLP

[57] ABSTRACT

The present invention relates to spherical solid components of catalysts for the polymerization of olefins comprising, supported on a magnesium dihalide in active form, a titanium compound containing at least one Ti-halogen bond, and optionally an electron donor compound. The spherical solid components of the invention are characterized by porosity values higher than 1 cm³/g and a pore size distribution such that at least 30% of their pores have an average radius greater than 10000 Å.

22 Claims, No Drawings

COMPONENTS AND CATALYSTS FOR THE POLYMERIZATION OF OLEFINS

FIELD OF THE INVENTION

The present invention relates to components of catalysts for the polymerization of olefins, to the catalyst obtained therefrom and to the their use in the polymerization of α-olefins $CH_2=CHR$, where R is hydrogen or an alkyl radical having 1–12 carbon atoms.

BACKGROUND INFORMATION

Catalyst supported on magnesium dihalide in active form are well-known from the technical literature. They were disclosed the first time in U.S. Pat. Nos. 4,298,718 and 4,495,338.

The need for having available high-activity catalysts capable of producing polymers with controlled morphological characteristics is felt in the industrial practice.

Examples of catalysts with controlled morphology are described in U.S. Pat Nos. 3,953,414 and 4,399,054. In the latter patent the components are prepared by starting from spherical form adducts of $MgCl_2$ with approximately 3 mols of alcohol. Prior to the reaction with $TiCl_4$ the alcohol content is decreased down to 2.5–2 mols: in this manner components are obtained which exhibit a porosity, as measured with nitrogen, of from 0.3 to 0.4 $cm^3$/g and an average pore radius comprised between 15 and 20 Å.

Catalyst prepared from $TiCl_4$ and $MgCl_2$ in granular form, by spray-drying an alcohol solution of magnesium chloride and subsequently supporting the titanium compound, are described in patents EP-B-65700 and EP-B-243327. However, the polymer obtained with these catalysts does not exhibit morphological characteristics of interest. In particular the bulk density is not sufficiently high. Furthermore, the activity of the catalyst is rather low.

A method for increasing the activity of these catalysts is described in patent EP-A-281524. The catalysts are prepared by supporting titanium alcoholates onto an $MgCl_2$-ethanol adduct containing from 18 to 25% by weight of ethanol spherulized by spray-drying an ethanol solution thereof, and subsequent chemical treatment with $Et_2AlCl$ or $Et_3Al_2Cl_3$. The conditions for preparing the support are critical and have an influence on the morphological stability of the resulting polymer. Polymers in the form of heterogeneous powder are obtained, for example, when supports are used the alcohol content of which is not comprised within the range 18–25%, or when compounds different from $Et_2AlCl$ or $Et_3Al_2Cl_3$ are used. Furthermore, in order to obtain sufficiently high yields, the Ti content in the solid component is always greater than 8% by weight.

From European patent application EP-A-395083, high-activity catalysts for olefin polymerization are known which are capable of producing polymers in the form of particles of spheroidal shape endowed with satisfactory morphological properties, in particular high bulk density.

When these catalysts are used for the polymerization of ethylene to produce LLDPE or in general ethylene copolymers with other α-olefins, the distribution of the comonomer in the polymeric chain is far from optimum.

The solid components of the catalysts described in EP-A-395083 are characterized by a high porosity (as measured by mercury method) and by a distribution of pore radii which is shifted towards pores with a relatively small radius (more than 50% of pores have radius smaller than 800 Å).

DESCRIPTION OF THE INVENTION

It has now unexpectedly been found that it is possible to prepare catalysts endowed with a high activity and capable of distributing uniformly the comonomer in the preparation of copolymers of ethylene with α-olefins and furthermore capable of yielding polymers of spheroidal shape endowed with valuable morphological properties.

The spherical solid components of the present invention comprise, supported on a magnesium dihalide in active form, a titanium compound containing at least one Ti-halogen bond and are characterized by porosity values higher than 1.0 $cm^3$/g and by a pore distribution such that at least 30% of said pores have a radius greater 10000 Å.

The total porosity is generally comprised between 1.2 and 2.2 $cm^3$/g; the porosity as referred to pores with a radius of up to 10000 A is generally comprised between 0.7 and 1 $cm^3$/g.

The specific surface area is higher than 30 $m^2$/g, and is generally comprised between 30 and 100 $m^2$/g.

The surface characteristic and the porosity are determined by mercury porosimetry according to the method hereinunder described.

The magnesium dihalide in active form comprised in the spherical component of the present invention are characterized by X-ray diffraction spectra wherein the most intense diffraction line appearing in the spectrum of the non-active halide shows a decreased intensity and in said spectra a halo appears, the maximum intensity of which is shifted towards lower angles with respect to the angle of the most intense line.

The particles of the solid component have a spherical or spheroidal morphology with an average diameter comprised between 10 and 150 μm. By "particles with spheroidal shape" those particles are meant in which the ratio of the major axis to the minor axis is equal to, or smaller than 1.5, and preferably smaller than 1.3.

The preferred titanium compounds have formula $Ti(OR^1)_nX_{y-n}$, wherein y is the titanium valency, n is comprised between 0 and (y-1), including limits, $R^1$ is an alkyl radical having from 2 to 8 carbon atoms, in particular n-butyl, iso-butyl, 2-ethylhexyl, n-octyl and phenyl, and X is halogen. When y is 4, n is preferably comprised between 1 and 2.

The adduct of magnesium halide, preferably magnesium dichloride, with alcohols from which the solid components are obtained, are prepared by starting from adducts in the molten state, by emulsifying them in an inert liquid hydrocarbon and then causing the resulting particles to solidify by fast quenching the emulsion. A typical method for preparing these spherulized adducts is described in U.S. Pat. No. 4,469,648, the disclosure of which is hereto incorporated by reference.

The solid spheroidal particles obtained in that way generally contain from 2.5 to 3.5 mol of alcohol. These particles are subsequently submitted to thermal treatment at temperature lower than 150° C., generally comprised between 50 and 130° C., in order to decrease their alcohol content down to values comprised between 0.1 and 2 mols per mol of magnesium dihalide.

The dealcoholated adducts are then reacted with a titanium compound under suitable conditions. The reaction with titanium compounds results in a further removal of alcohol from the adduct, with magnesium dihalide in active form being obtained, and leads to fixing on the same a titanium compound having the formula $Ti(OR)_nX_{y-n}$, wherein y is the titanium valency, n is a number comprised between 0 and (y-1), including limits, X is halogen, R is an alkyl, cycloalkyl or aryl radical having 1–18 carbon atoms, or a —COR moiety.

Particularly interesting are those compounds having the above said general formula, and in which y is 4, n may range between 1 and 2, X is chlorine and R is selected among n-butyl, isobutyl, 2-ethylhexyl, n-octyl and phenyl.

Typical titanium compounds which may be used in the reaction with said adduct are titanium tetrahalides, in particular $TiCl_4$, and titanium trichloroalcoholates, such as, e.g., tri-chlorobutoxy titanium and trichlorophenoxy titanium. In these cases the compound of titanium may be optionally reduced by using reducing agents capable of lowering the titanium valency down to a value of less than 4.

As examples of reducing compounds Al-trialkyl compounds or silicon compounds, such as e.g., polyhydrogensiloxanes, may be cited.

It is also possible to use titanium alcoholates having the formula $Ti(OR)_4$. However in this case it must be used a halogenating compound, such as, e.g., $SiCl_4$, $TiCl_4$ itself, $AlCl_3$ and in general compound which are capable of forming titanium haloalcoholates and of reacting with the —OH radicals of the $MgCl_2$.alcohol adduct in order to further dealcoholating it, or in order to bring alcohol removal to completion.

Among these compounds also Al-alkyl halides fall, as well as, in general, compounds having halogenating and reducing activity. In these cases the titanium valency is lowered and titanium halo-alcoholates are formed, wherein Ti is at a valency lower than 4.

It is also possible to use complexes of titanium alcoholates with magnesium halides. These complexes can be prepared according to the methods described in U.S. Pat. No. 4,218,339, the description of which is herein incorporated by reference.

The molar ratio in the reaction between titanium compound and magnesium in the adduct is generally comprised within the range of from 0.3 to 3, and preferably of from 0.5 to 2.

The amount of titanium, expressed as metal Ti, which remains fixed on the carrier may reach, e.g., the value of 15% by weight and preferably is comprised between 1 to 12%. The titanium compound supported on magnesium halide is fixed in a form which can not be extracted with solvents; it may also be partially present in extractable form.

The components according to the present invention may possibly additionally comprise, in particular when LLDPE with a particularly narrow molecular weight distribution has to be produced, also an electron donor compound, for example a compound selected from ethers, esters, amines and ketones.

In particular said electron donor compound can be selected from alkyl, cycloalkyl and aryl esters of polycarboxylic acid, such as, e.g., esters of phthalic and maleic acids, in particular n-butyl phthalate, diisobutylphthalate, di-n-octyl phthalate; other useful compounds are those which are described in European patent application EP-A-344755, the disclosure of which is hereto incorporated by reference, in particular, 2-methyl-2-isobutyl-1,3-dimetoxypropane; 2-methyl-2-isopropyl-1,3-dimetoxypropane; 2-methyl-2-isopentyl-1,3-dimetoxypropane; 2,2-diisobutyl-1,3-dimetoxypropane.

The electron donor compound is generally present in a molar ratio, with respect to magnesium, of up to 1:2, and preferably comprised between 1:8 and 1:12.

By reacting them with Al-alkyl compounds, in particular Al-trialkyl compounds, the components according to the invention give rise to catalysts which, as already mentioned above, are capable of uniformly distributing the comonomer in the polymer chain, and furthermore make it possible to obtain polymer endowed with particularly interesting morphological characteristics by gas-phase polymerization.

Examples of Al-alkyl compounds usable in catalyst preparation are Al-trialkyl compounds, in particular Al-triethyl, Al-triisobutyl, Al-tri-n-butyl. The ratio of Al:Ti is higher than 1 and generally is comprised between 20 and 800.

As already mentioned the components according to the present invention are particularly useful in the production of ethylene copolymers with α-olefins $CH_2$=CHR, in particular linear low density polyethylenes (LLDPE, having a density lower than 0.940) and very low density and ultra low density polyethylene (VLDPE and ULDPE, having a density lower than 0.920 and down to 0.880) consisting of copolymers of ethylene with one or more α-olefins having from 3 to 8 carbon atoms, in particular butene-1, pentene-1, 4-methyl-pentene-1, hexene-1, octene-1.

In said copolymer the content by weight of units derived from ethylene is generally greater than approximately 80%.

The components according to the present invention are advantageously used also in the preparation of high density polyethylenes (HDPE, with density values higher than 0.940) including ethylene homopolymers and copolymers with α-olefins having from 3 to 14 carbon atoms, and in the preparation of elastomeric ethylene and propylene copolymers and elastomeric terpolymers of ethylene and propylene with minor amounts of a diene, having a content of units derived from ethylene comprised between about 30 and 70% by weight.

The polymerization of olefins in the presence of the catalysts obtained from the catalyst components of the present invention can be carried out according to known method, both in the liquid phase and in the gas phase, using for examples the well-known fluidized-bed technique, or under condition in which the polymer is mechanically stirred.

The following examples are supplied for merely illustrative purposes, and should not be construed as being limitative of the invention itself.

The properties indicated were determined according to the following methods:

Porosity and specific surface area with nitrogen: these characteristics are determined according to the B.E.T methodology (apparatus used SORPTOMATIC 1800 by Carlo Erba).

Porosity and specific surface area with mercury: these properties are determined by immersing a known amount of sample in a known amount of mercury inside a dilatometer and then gradually increasing mercury pressure by a hydraulic means. The pressure of mercury entering the pores is a function of the diameter of the pores. The measurement is carried out by using a "Porosimeter 2000 Series" porosimeter by Carlo Erba. From the data of mercury volume decrease and of applied pressure, porosity, pore distribution and specific surface area are calculated.

Size of the catalyst particles: this value is determined according to a method based on the principle of optical diffraction of monochromatic laser light, using the "Malvern Instr. 2600" apparatus.

MIE flow index: ASTM-D 1238
MIF flow index: ASTM-D 1238

Flowability: it is the time required by 100 g of polymer to flow through a funnel, the outlet opening thereof having a diameter of 1.25 cm, and the side walls being inclined at 20° to the vertical.

Bulk density: DIN-53194

Morphology and Granulometric distribution of the polymer particles: ASTM-D 1921-63

Fraction soluble in xylene: determined at 25° C.

Comonomer content: percentage by weight, as determined via I.R. spectra.

Real density: ASTM-D 792.

EXAMPLES

Preparation of Spherical Support ($MgCl_2$/EtOH Adduct)

The adduct of magnesium chloride and alcohol was prepared by following the method as described in example 2 of U.S. Pat No. 4,399,054 but operating at 2000 RPM instead of 10000 RPM.

The adduct, containing approximately 3 alcohol mols, had an average size of approximately 60 μm, with a dispersion range of approximately 30–90 μm.

Example 1

Preparation of the Solid Component

The spherical support prepared according to the general procedures as descibed hereinabove, was submitted to a thermal treatment, within the temperature range 50°–150° C., until a partial dealcoholation was obtained, with the residual alcohol content being of 35% (the molar ratio of ethanol:Mg was of 1.1).

| | |
|---|---|
| porosity (B.E.T) | 0.017 $cm^3/g$ (pores < 100 Å) |
| | 0.114 $cm^3/g$ (pores > 100 Å) |
| | 0.131 $cm^3/g$ (total value) |
| surface area (B.E.T) | 15.8 $m^2/g$ |
| porosity (mercury) | 0.43 $cm^3/g$ (pores < 10000 Å) |
| | 0.775 $cm^3/g$ (pores > 10000 Å) |
| | 1.205 $cm^3/g$ (total value) |
| surface area (mercury) | 15.8 $m^2g$ |

400 g of the so obtained support was charged in a 6 liters reactor together with 4 liters of anhydrous heptane. While stirring and at room temperature, 568 g of $TiCl_4$ was gradually added. The reaction mixture was kept at 80° C. for 2 hours, and the solid portion was washed with inert solvent until free $TiCl_4$ was removed.

After drying, the resulting catalytic component obtained with spherical shape displayed the following characteristic:

| | |
|---|---|
| total titanium | 3.8% (by weight) |
| Mg | 17.0% (by weight) |
| Cl | 62.7% (by weight) |
| OEt | 6.6% (by weight) |
| porosity (B.E.T.) | 0.41 $cm^3/g$, 50% of which was due to pores with radius > 90 Å. |
| surface area (B.E.T.) | 185 $m^2/g$ |
| porosity (mercury) | 1.52 $cm^3/g$, 46% of which was due to pores with radius > 10000 Å. The value of porosity due to pores with radius < 10000 Å was 0.756 $cm^3/g$. |
| surface area (mercury) | 49.4 $m^2/g$. |

Ethylene Polymerization (HDPE)

To an autoclave of 4 l, purged with an inert gas, 900 $cm^3$ of hexane containing 0.45 g of $AlEt_3$ and 0.012 g of spherical component suspended in 100 $cm^3$ of the same mixture of $AlEt_3$/hexane as previously described, were charged. While stirring the autoclave was heated up to 75° C. and then 3 bars of $H_2$ and 7 bars of ethylene were fed. The polymerization time was of 3 hours, during which time ethylene pressure was kept constant. After 3 hours the reaction was interrupted by instantaneously venting ethylene and hydrogen. 252 g of polymer having the following characteristics was obtained:

| | |
|---|---|
| MIE | 0.42 g/10 min |
| MIF/MIE | 35 |
| real density | 0.962 $g/cm^3$ |
| bulk density (poured) | 0.33 $g/cm^3$ |
| flowability | 14 sec |
| morphology | spherical |
| P.S.D.   > 4000 μm | < 0.5% (by weight) |
| 2000–4000 μm | 30–40% (by weight) |
| 1000–2000 μm | 50–60% (by weight) |
| 500–1000 μm | 2–5% (by weight) |
| < 500 μm | < 1% (by weight) |

Copolymerization of Ethylene with 1-butene (LLDPE)

To an autoclave of 4 liters of stainless steel, purged with a $N_2$ stream for 2 hours at 70° C., and then washed with anhydrous propane, 0.012 g of solid component and 0.96 g of Al-triethyl mixed with 25 $cm^3$ of hexane, were charged, together with 800 g of anhydrous propane. The autoclave was heated up to 75° C. and then 2 bars of $H_2$ was fed simultaneously with 7 bars of ethylene and 200 g of 1-butene.

During the polymerization ethylene partial pressure was kept constant and 3 g of 1-butene were added per each 30 g of ethylene fed. After three hours the reaction was interrupted by instantaneously venting off the reactants and propane. The amount of polymer produced was 300 g. The polymer characteristics were the following:

| | |
|---|---|
| MIE | 0.9 g/10 min |
| MIF/MIE | 31 |
| real density | 0.920 $g/cm^3$ |
| xylene soluble fraction | 10% |
| linked butene | 6.5% |
| bulk density (poured) | 0.40 $g/cm^3$ |
| flowability | 15 sec |
| morphology | spherical |
| P.S.D.   > 4000 μm | < 0.5% (by weight) |
| 2000–4000 μm | 30–40% (by weight) |
| 1000–2000 μm | 40–60% (by weight) |
| 500–1000 μm | 2–4% (by weight) |
| < 500 μm | < 1% (by weight) |

Example 2

The spherical support prepared according to the above described general procedure was submitted to thermal treatment according to the procedure described in Example 1, followed by a further thermal treatment within the temperature range of 100°–130° C., until a value of residual alcohol of about 15% by weight was obtained.

500 g of support obtained in that way was charged to a 5 liters reactor, together with 2.5 liters of anhydrous heptane. 455 g of $TiCl_4$ was gradually fed while stirring at room temperature. The reaction mixture was then heated up to 100° C. during 60 min and then was kept at that temperature for 2 hours. The liquid phase was discharged and the solid phase was then washed with hexane. 2 liters of hexane was added and then 250 g $Al_2Et_3Cl_3$, diluted in 1000 $cm^3$ of hexane, was fed during a 30-minute time, at room temperature. The mixture was heated at 60° C. for 2 hours. The reaction mixture was washed three times with 2 liters of hexane and then was vacuum dried at 50 ° C.

The catalytic component obtained in spherical form displayed the following characteristics:

| | |
|---|---|
| total titanium | 3.5% (by weight) |
| $Ti^{III}$ | 2.9% (by weight) |
| Mg | 20.0% (by weight) |
| Cl | 69% (by weight) |
| OEt | 3.2% (by weight) |
| porosity (B.E.T.) | 0.401 cm$^3$/g, 50% of which was due to pores with radius > 190 Å. |
| surface area (B.E.T.) | 110 m$^2$/g |
| porosity (mercury) | 1.18 cm$^3$/g, 35% of which was due to pores with radius > 10000 Å. The value of porosity due to pores with radius < 10000 Å was 0.743 cm$^3$/g; within the range 0–10000 Å, 50% of pores had a radius of >720 Å. |
| surface area (mercury) | 47.4 m$^2$/g. |

Ethylene Polymerization (HDPE)

Ethylene polymerization was carried out as described in Example 1 using 0.014 g of spherical solid component. 310 g of polymer was obtained as particles of spherical shape, having the following characteristics:

| | | |
|---|---|---|
| MIE | | 0.186 g/10 min |
| MIF/MIE | | 63 |
| real density | | 0.962 g/cm$^3$ |
| bulk density (poured) | | 0.40 g/cm$^3$ |
| flowability | | 14 sec |
| morphology | | spherical |
| P.S.D. | > 4000 μm | < 0.5% (by weight) |
| | 2000–4000 μm | 30–40% (by weight) |
| | 1000–2000 μm | 50–60% (by weight) |
| | 500–1000 μm | 2–4% (by weight) |
| | < 500 μm | < 1% (by weight) |

Copolymerization of Ethylene with 1-butene (LLDPE)

0.0154 g of spherical solid component was used in order to copolymerized ethylene and 1-butene according to the same procedure as described in Example 1. 340 g of polymer having the following characteristic was obtained:

| | | |
|---|---|---|
| MIE | | 0.47 g/10 min |
| MIF/MIE | | 30 |
| real density | | 0.917 g/cm$^3$ |
| xylene soluble fraction | | 11% |
| linked butene | | 6.1% |
| bulk density (poured) | | 0.41 g/cm$^3$ |
| morphology | | spherical |
| P.S.D. | > 4000 μm | < 0.5% (by weight) |
| | 2000–4000 μm | 30–40% (by weight) |
| | 1000–2000 μm | 50–60% (by weight) |
| | 500–1000 μm | 1–3% (by weight) |
| | < 500 μm | < 1% (by weight) |

Example 3

The spherical support prepared according to the above described general procedure was submitted to thermal treatment according to the procedure described in Example 1, followed by a further thermal treatment within the temperature range of 100°–130° C., until a value of residual alcohol of about 10% by weight was obtained.

2000 g of support obtained in that way was charged into a reactor of 30 liters, together with 20 liters of anhydrous heptane. The suspension was heated up to 45° C. and, while stirring, the following compounds were gradually and sequentially added: 6000 g of Ti(OBu)$_4$ within a 30-minute time; 2400 g of polymethylhydrogensiloxane (PMHS), within a 30-minute time; 4260 g of SiCl$_4$, within a 60-minute time. The reaction mixture was then heated up to 50° C. during 30 minutes and then was kept at that temperature for 2 hours. The reaction mixture was washed several times in order to remove the excess reactants and the extremely fine powder present by filtering or settling. The spherical component was dried under vacuum at 50° C. and displayed the following characteristics:

| | |
|---|---|
| total titanium | 2.76% (by weight) |
| $Ti^{III}$ | 1.9% (by weight) |
| Mg | 19.2% (by weight) |
| Cl | 59.75% (by weight) |
| OEt | 1.1% (by weight) |
| OBu | 9.9% (by weight) |
| porosity (B.E.T.) | 0.238 cm$^3$/g, 50% of which was due to pores with radius > 130 Å. |
| surface area (B.E.T.) | 59.8 m$^2$/g |
| porosity (mercury) | 1.64 cm$^3$/g, 52% of which was due to pores with radius > 10000 Å. The value of porosity due to pores with radius < 10000 Å was 0.8 cm$^3$/g. |
| surface area (mercury) | 56.6 m$^2$/g. |

Copolymerization of Ethylene with 1-butene (LLDPE)

The copolymerization of ethylene and 1-butene according to the same procedure as described in Example 1 yielded a polymer displaying the following characteristics:

| | |
|---|---|
| real density | 0.9165 g/cm$^3$ |
| xylene soluble fraction | 15.2% |
| linked butene | 7.9% |
| bulk density (poured) | 0.41 g/cm$^3$ |
| morphology | spherical |
| inherent viscosity | 1.8 dl/g (THN; 135° C.) |
| yield | 18.3 kg/g catalyst. |

Ethylene Polymerization (HDPE)

The polymerization of ethylene carried out according to the same procedure as described in Example 1 yielded a polymer constituted by spherical particles having the following characteristics:

| | | |
|---|---|---|
| MIE | | 0.48 g/10 min |
| MIF/MIE | | 33.3 |
| bulk density (poured) | | 0.40 g/cm$^3$ |
| flowability | | 18 sec |
| morphology | | spherical |
| P.S.D. | > 4000 μm | 0% (by weight) |
| | 2000–4000 μm | 4.4% (by weight) |
| | 1000–2000 μm | 80% (by weight) |
| | 500–1000 μm | 13% (by weight) |
| | < 500 μm | 2.6% (by weight) |
| yield | | 13 kg/g catalyst |

Example 4

The spherical support prepared according to the procedure as described in the general procedure was submitted to thermal treatment as described in example 1, followed by further thermal treatment within the temperature range of 100°–130° C., until a value of residual alcohol of about 10% by weight was obtained.

403 g of support obtained in that way was suspended in 300 cm$^3$ of anhydrous heptane and was treated for 30 minutes with 230 cm$^3$ of a solution obtained by mixing at 60° C. 120 cm$^3$ of Ti(OBu)$_4$, 100 cm$^3$ of heptane and 10 cm$^3$ of SiCl$_4$. The suspension was heated at 45° C. and, within 30-minute time, was treated with 10 cm$^3$ of polymethylhydrogensiloxane (PMHS), and subsequently within 60-minute time, and still at the same temperature, with 60 cm$^3$ of SiCl$_4$. The solid was decanted off, and a set of washes were carried out according to the same methodology as of Example 3. The solid spherical component was dried at 50° C. and had the following characteristics:

| | |
|---|---|
| total titanium | 4.6% (by weight) |
| Ti$^{III}$ | 3.4% (by weight) |
| Mg | 16% (by weight) |
| Cl | 55.8% (by weight) |
| OEt | 5% (by weight) |
| OBu | 9.2% (by weight) |
| porosity (mercury) | 1.46 cm$^3$/g, 52% of which was due to pores with radius > 10000 Å. The value of porosity due to pores with radius < 10000 Å was 0.7 cm$^3$/g. |
| surface area (mercury) | 55.1 m$^2$/g. |

Ethylene Polymerization (HDPE)

The polymerization was carried out in the same way as disclosed in Example 1, except for operating at 85° C. and with a H$_2$ pressure of 4.7 bars and with an ethylene pressure of 6.3 bars. A product was obtained as spherical particles, which displayed the following characteristics:

| | | |
|---|---|---|
| MIE | | 2.8 g/10 min |
| MIF/MIE | | 29.8 |
| Bulk density (poured) | | 0.39 g/cm$^3$ |
| Flowability | | 17 sec |
| Morphology | | spherical |
| P.S.D. | 2000–4000 μm | 0.4% (by weight) |
| | 1000–2000 μm | 50% (by weight) |
| | 500–1000 μm | 48% (by weight) |
| | < 500 μm | 1.6% (by weight) |
| yield | | 10 kg/g catalyst |

Example 5

Two solutions were prepared separately from each other, inside glass reactors of 5 liters of capacity.

Solution (A): 2.4 l of anhydrous heptane was mixed with 1690 g of titanium tetrabutoxyde. Still at room temperature 868 g of AlCl$_3$ was added. The reaction mixture was heated to 100° C. and after 2 hours at this temperature a solution was obtained which was cooled at room temperature.

Solution (B): to 1710 g of Al$_2$Et$_2$Cl$_3$ charged into a flask, 1163 g of AlCl$_3$ was added. The temperature of the resulting suspension was increased to 70° C. and the resulting mixture was kept stirred 2 hours at that temperature. The resulting solution was cooled down to room temperature.

To a stirred glass reactor of 25 liters equipped with reflux condenser the solution (A) was charged. 1446 g of a spherical support was then fed at room temperature. The support had been prepared according to the general methodologies and dealcoholated as described in the preceding examples down to an alcohol content of 9.8% by weight. The suspension was heated to 60° C. and was kept 2 hours at that temperature and then was cooled down to 15° C.

During 2 hours the solution (B) was added while cooling in order to keep the temperature at a constant value. The suspension was heated to 70° C. during a 1.5-hour time and was kept stirred at that temperature for one further hour. After cooling down to 50° C. the resulting suspension of red colour was left standing for 15 minutes. The supernatant liquid phase, which contains also an extremely fine powder material (of nonspherical shape) was removed by siphoning.

By means of the same process the residual spherical solid material was repeatedly washed with hexane until any powder fraction and chlorine were removed. The spherical catalyst was then dried under vacuum at 50° C., for 4 hours. 1200 g of a dry product were obtained, which displayed the following elemental composition:

| | |
|---|---|
| total titanium | 11.9% (by weight) |
| Ti$^{III}$ | 11.6% (by weight) |
| Mg | 12.6% (by weight) |
| Cl | 69.6% (by weight) |
| OEt | 0.2% (by weight) |
| OBu | 0.2% (by weight) |
| Al | 1.7% (by weight) |
| porosity (mercury) | 1.33 cm$^3$/g, 47% of which was due to pores with radius > 10000 Å. The value of porosity due to pores with radius < 10000 Å was 0.7 cm$^3$/g. |
| surface area (mercury) | 57.8 m$^2$/g. |

Ethylene Polymerization (HDPE)

The polymerization was carried out in the same way as described in Example 1. A product consisting of spherical particles was obtained, which displayed the following characteristics:

| | |
|---|---|
| MIE | 0.18 g/10 min |
| MIF/MIE | 94.6 |
| bulk density (poured) | 0.42 g/cm$^3$ |
| morphology | spherical |
| yield | 13.5 kg/g |

Copolymerization of Ethylene with 1-butene (LLDPE)

The copolymerization of ethylene and 1-butene according to the same procedure as described in Example 1 yielded a polymer displaying the following characteristics:

| | |
|---|---|
| real density | 0.908 g/cm$^3$ |
| xylene soluble fraction | 23.5% |
| bulk density (poured) | 0.45 g/cm$^3$ |
| morphology | spherical |
| inherent viscosity | 1.89 dl/g (THN; 135° C.) |
| yield | 32.6 kg/g catalyst. |

Example 6

Continuous Gas-phase Polymerization of Ethylene and 1-butene to Obtain LLDPE 1.19 g/hour of catalyst, prepared as in Example 2, was prepolymerized with ethylene in continuous at 30° C., with 6.62 g/hour of TEAL being fed.

The resulting prepolymer was continuously fed to a gas-phase fluidized bed reactor, which was at 80° C. and under a 20-bar pressure, and with the following molar composition:

| | |
|---|---|
| propane | 84.3% |
| ethylene | 11.5% |
| 1-butene | 1.6% |
| hydrogen | 2.1% |

An average yield of 9.6 Kg/g catalyst was obtained. The resulting polymer displays the following characteristics:

| | |
|---|---|
| MIE | 0.87 g/10 min |
| MIF/MIE | 35.8 |

-continued

| | |
|---|---|
| real density | 0.921 g/cm³ |
| xylene soluble fraction | 13.2% |
| linked butene | 6.9% |
| bulk density (poured) | 0.39 g/cm³ |
| bulk density (tamped) | 0.42 g/cm³ |
| flowability | 12 sec |
| morphology | spherical |
| P.S.D. > 4000 μm | < 0.1% (by weight) |
| 2000–4000 μm | 53.5% (by weight) |
| 1000–2000 μm | 42.0% (by weight) |
| 500–1000 μm | 3.5% (by weight) |
| < 500 μm | < 0.9% (by weight) |

We claim:

1. Spherical components of catalysts for olefin polymerization comprising a titanium compound having at least one titanium-halogen bond, supported on a magnesium dihalide in active form, the magnesium dihalide in active form being characterized by an X-ray diffraction spectrum wherein the most intense diffraction line appearing in the spectrum of the non-active halide shows a decreased intensity, and in said spectrum a halo appears, the maximum intensity of which is shifted towards lower angles with respect to the angles of the most intense line, wherein:

(a) the total porosity of the catalyst component is greater than 1.0 cm³/g; and
   (b) the pore radius distribution of the catalyst component is such that at least 30% of the total porosity is due to pores having a radius greater than 10,000 Å; and
   (c) the total titanium content of the catalyst component, expressed as metallic titanium, is greater than about 2.7% by weight.

2. Spherical components according to claim 1 wherein the total porosity is comprised between 1.2 and 2.2 cm³/g.

3. Spherical components according to claim 1 wherein the porosity due to pores with radius up to 10000 Å is comprised between 0.7 and 1 cm³/g.

4. Spherical components according to claim 1 wherein the surface area is comprised between 30 and 100 m²/g.

5. Spherical components according to claim 1 wherein the magnesium dihalide in active form is $MgCl_2$.

6. Spherical components according to claim 1 wherein an electron donor compound is also present.

7. Spherical components according to claim 1 wherein the titanium compound has the formula $Ti(OR^1)_nX_{y-n}$, in which y is the titanium valency, $0 \leq n \leq (y-1)$, X is halogen, $R^1$ is an alkyl radical having 2–8 carbon atoms.

8. Spherical components according to claim 7 wherein y is 4 and n is comprised between 1 and 2.

9. Spherical components according to claim 7 wherein X is chlorine.

10. Spherical components according to claim 7 wherein $R^1$ is selected from n-butyl, isobutyl, 2-ethylhexyl, n-octyl, phenyl.

11. Spherical components according to claim 6 wherein the electron donor compound is selected from ethers and alkyl, cycloalkyl, aryl esters of polycarboxylic acids.

12. A method for obtaining a spherical component of catalysts for olefin polymerization comprising a titanium compound having at least one titanium-halogen bond, supported on a magnesium dihalide in active form, the magnesium dihalide in active form being characterized by an X-ray diffraction spectrum wherein the most intense diffraction line appearing in the spectrum of the non-active halide shows a decreased intensity, and in said spectrum a halo appears, the maximum intensity of which is shifted towards lower angles with respect to the angles of the most intense line, wherein:

(i) the total porosity of the catalyst component is greater than 1.0 cm³/g;
   (ii) the pore radius distribution of the catalyst component is such that at least 30% of the total porosity is due to pores having a radius greater than 10,000 Å; and
   (iii) the total titanium content of the catalyst component, expressed as metallic titanium, is greater than about 2.7% by weight wherein said method comprises reacting:
      (a) an adduct having the formula $MgCl_2 \cdot mROH$, wherein $0.1 \leq m \leq 2$ and R is an alkyl, cycloalkyl or aryl radical having 1–12 carbon atoms; with
      (b) a titanium compound having the formula $Ti(OR)_nX_{y-n}$, wherein $0.5 \leq n \leq (y-1)$, y is the titanium valency, X is halogen, and R is an alkyl, cycloalkyl or aryl radical having 1–18 carbon atoms or a —COR moiety;

said adduct (a) being prepared by thermal dealcoholation of adducts $MgCl_2 \cdot pROH$, in which $2.5 \leq p \leq 3.5$.

13. A method according to claim 12 wherein in the reaction between compound (b) and adduct (a), the molar ratio of Ti:Mg is comprised between 0.3 and 3.

14. A method according to claim 12 wherein in the reaction of compound (b) and adduct (a) the compound (b) is a trichloroacoholate of tetravalent titanium.

15. A method for obtaining a spherical component of catalysts for olefin polymerization comprising a titanium compound having at least one titanium-halogen bond, supported on a magnesium dihalide in active form, the magnesium dihalide in active form being characterized by an X-ray diffraction spectrum wherein the most intense diffraction line appearing in the spectrum of the non-active halide shows a decreased intensity, and in said spectrum a halo appears, the maximum intensity of which is shifted towards lower angles with respect to the angles of the most intense line, wherein:

(i) the total porosity of the catalyst component is greater than 1.0 cm³/g;
   (ii) the pore radius distribution of the catalyst component is such that at least 30% of the total porosity is due to pores having a radius greater than 10,000 Å; and
   (iii) the total titanium content of the catalyst component, expressed as metallic titanium, is greater than about 2.7% by weight wherein said method comprises reacting:
      (a) an adduct having the formula $MgCl_2 \cdot mROH$, wherein $0.1 \leq m \leq 2$ and R is an alkyl, cycloalkyl or aryl radical having 1–12 carbon atoms; with
      (b) a titanium compound having the formula $Ti(OR)_nX_{y-n}$, wherein $0.5 \leq n \leq (y-1)$, y is the titanium valency, X is halogen, and R is an alkyl, cycloalkyl or aryl radical having 1–18 carbon atoms or a —COR moiety; and optionally with
      (c) a reducing compound or a halogenating and reducing compound:

said adduct (a) being prepared by thermal dealcoholation of adducts $MgCl_2 \cdot pROH$, in which $2.5 \leq p \leq 3.5$.

16. A method according to claim 15 wherein in the reaction of compound (b) and adduct (a) the molar ratio of titanium present in compound (b) to magnesium present in adduct (a) is comprised between 0.3 and 3.

17. A method according to claim 15 wherein in the reaction of components (a) and (b) the compound (b) is $TiCl_4$ or $Ti(OR)Cl_3$.

18. A method for obtaining a spherical component of catalysts for olefin polymerization comprising a titanium compound having at least one titanium-halogen bond, supported on a magnesium dihalide in active form, the magnesium dihalide in active form being characterized by an X-ray diffraction spectrum wherein the most intense diffraction line appearing in the spectrum of the non-active halide shows a decreased intensity, and in said spectrum a halo appears the maximum intensity of which is shifted towards lower angles with respect to the angles of the most intense line, wherein:

(i) the total porosity of the catalyst component is greater than 1.0 cm$^3$/g;

(ii) the pore radius distribution of the catalyst component is such that at least 30% of the total porosity is due to pores having a radius greater than 10,000 Å; and (iii) the total titanium content of the catalyst component, expressed as metallic titanium, is greater than about 2.7% by weight wherein said method comprises reacting:

(a) an adduct having the formula MgCl$_2$·MROH, wherein $0.1 \leq m \leq 2$ and R is an alkyl, cycloalkyl or aryl radical having 1–12 carbon atoms;

(b) a titanium compound having the formula Ti(OR)$_n$X$_{4-n}$, wherein $2 \leq n \leq 4$, R is an alkyl, cycloalkyl or aryl radical having 1–18 carbon atoms or a —COR moiety, and X is a halogen; and (c) a halogenating compound, optionally a reducing compound, or a compound having halogenating and reducing activity;

said adduct (a) being prepared by thermal dealcoholation of MgCl$_2$pROH adducts, in which $2.5 \leq p \leq 3.5$.

19. A method according to claim 18 wherein in the reaction of components (a) and (b) the molar ratio of titanium present in compound (b) to magnesium present in adduct (a) is comprised between 0.3 and 3.

20. A method according to claim 18 wherein in the reaction of components (a) and (b) the compound (b) is Ti(OR)$_4$.

21. Catalysts for the polymerization of olefins CH$_2$=CHR, wherein R is hydrogen or an alkyl or cycloalkyl or aryl radical having 1–12 carbon atoms, comprising the reaction product between the spherical components according to claim 1 and an Al-alkyl compound.

22. Catalysts according to claim 21 wherein the organometallic compound is an Al-trialkyl compound.

* * * * *